US006589005B1

(12) United States Patent
Hull

(10) Patent No.: US 6,589,005 B1
(45) Date of Patent: Jul. 8, 2003

(54) TILT BED TRAILER

(75) Inventor: Curtis Hull, Clarinda, IA (US)

(73) Assignee: H & H Trailer Company, Inc., Clarinda, IA (US)

( * ) Notice: Subject to any disclaimer, the term of this patent is extended or adjusted under 35 U.S.C. 154(b) by 27 days.

(21) Appl. No.: 09/654,947

(22) Filed: Sep. 1, 2000

(51) Int. Cl.[7] .................................................. B60P 1/04
(52) U.S. Cl. ..................................... 414/483; 280/456.1
(58) Field of Search ................................ 414/480, 482, 414/483; 298/5, 17 R; 280/456.1, 462, 463, 491.1

(56) References Cited

U.S. PATENT DOCUMENTS

| | | | |
|---|---|---|---|
| 2,491,417 A | * 12/1949 | Pflantz et al. ................... 298/5 |
| 2,609,212 A | * 9/1952 | McMurtrie | |
| 2,628,126 A | * 2/1953 | Black .............................. 298/5 |
| 2,744,643 A | 5/1956 | Hipp ........................... 214/506 |
| 2,803,362 A | * 8/1957 | Saenz | |
| 3,228,546 A | 1/1966 | Bunch ......................... 214/505 |
| 3,450,281 A | * 6/1969 | Groberg | |
| 3,602,384 A | 8/1971 | Warren ........................ 214/506 |
| 3,620,397 A | * 11/1971 | Gagnon ........................... 298/5 |
| 3,661,286 A | 5/1972 | Smith .......................... 214/506 |
| 4,208,856 A | 6/1980 | Husky .......................... 53/438 |
| 4,391,562 A | * 7/1983 | Hetzner ....................... 414/483 |
| 4,490,089 A | * 12/1984 | Welker ........................ 414/483 |
| 4,511,181 A | * 4/1985 | Schantz .......................... 298/5 |
| 4,872,728 A | 10/1989 | Adams ........................... 298/5 |
| 5,137,414 A | 8/1992 | Sloan et al. ................. 414/477 |
| 5,474,416 A | * 12/1995 | Rogge et al. ................ 414/482 |
| 5,544,944 A | * 8/1996 | Keech ............................ 298/5 |
| 5,775,868 A | 7/1998 | Mann .......................... 414/475 |
| 5,782,514 A | 7/1998 | Mann .......................... 293/118 |
| 5,967,733 A | 10/1999 | Cash ........................... 414/483 |
| 6,053,691 A | 4/2000 | Weseman .................... 414/480 |

* cited by examiner

*Primary Examiner*—James W. Keenan
(74) *Attorney, Agent, or Firm*—WM Bruce Day

(57) ABSTRACT

The present invention is directed to a tilt bed trailer which includes a frame platform with transport wheels. A V-shaped draw tongue has rearwardly diverging draw arms which terminate in sleeve ends that are spaced the width of the frame platform. Hinge connections extend between the frame platform and the draw tongue with each hinge connection including left and right hinge supports extending downwardly below the frame platform and the side rails with a hinge rod extending therebetween. The draw arm sleeve ends are sleeved on the hinge rods so that the draw tongue swings vertically relative to the frame platform. An extensible member such as a hydraulic ram extends longitudinally angularly between the platform front end and the front portion of the draw tongue so that upon extension the frame platform tilts upwardly and rearwardly about the transport wheels to lower the frame platform rear end to the ground for ease of loading.

3 Claims, 3 Drawing Sheets

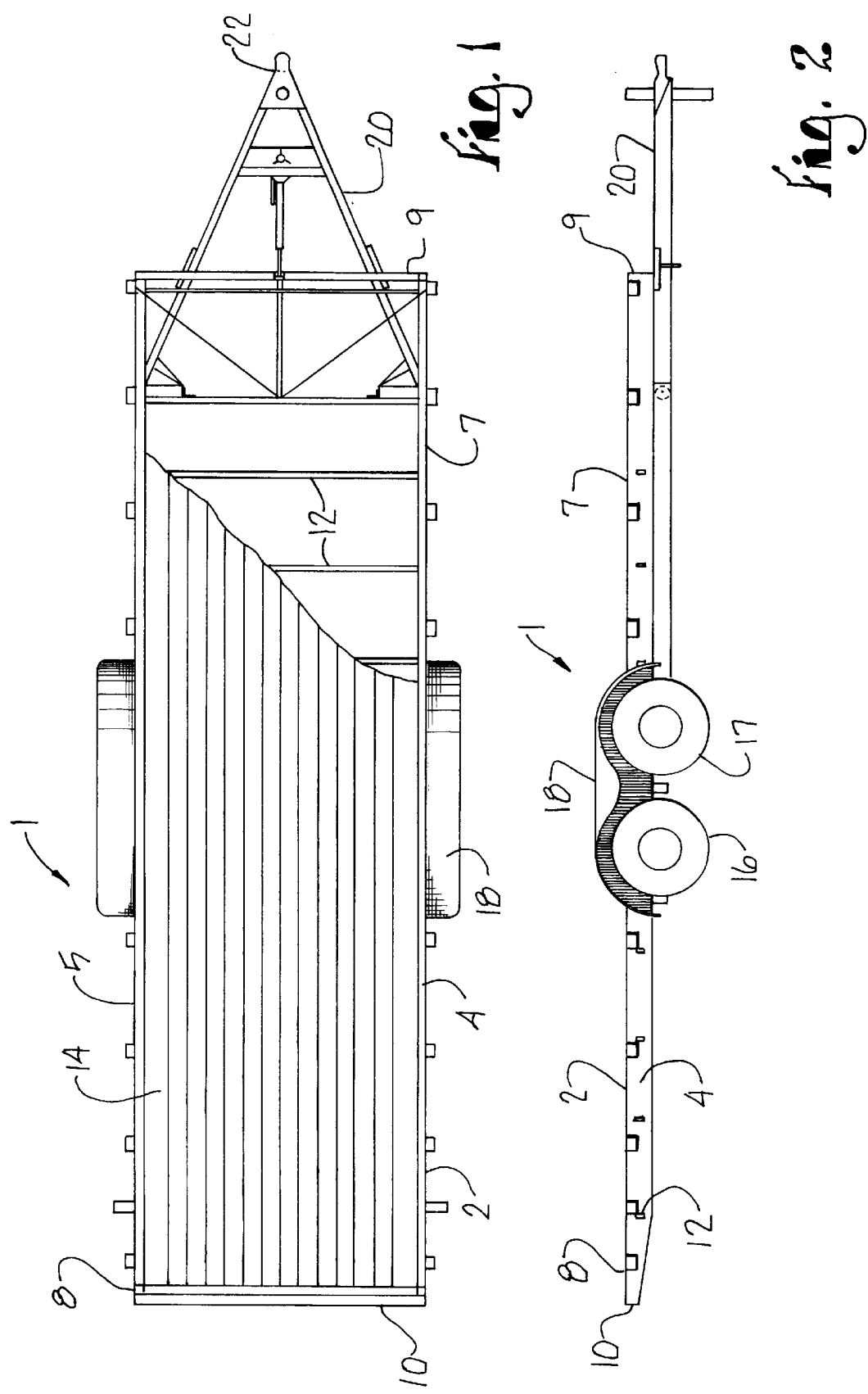

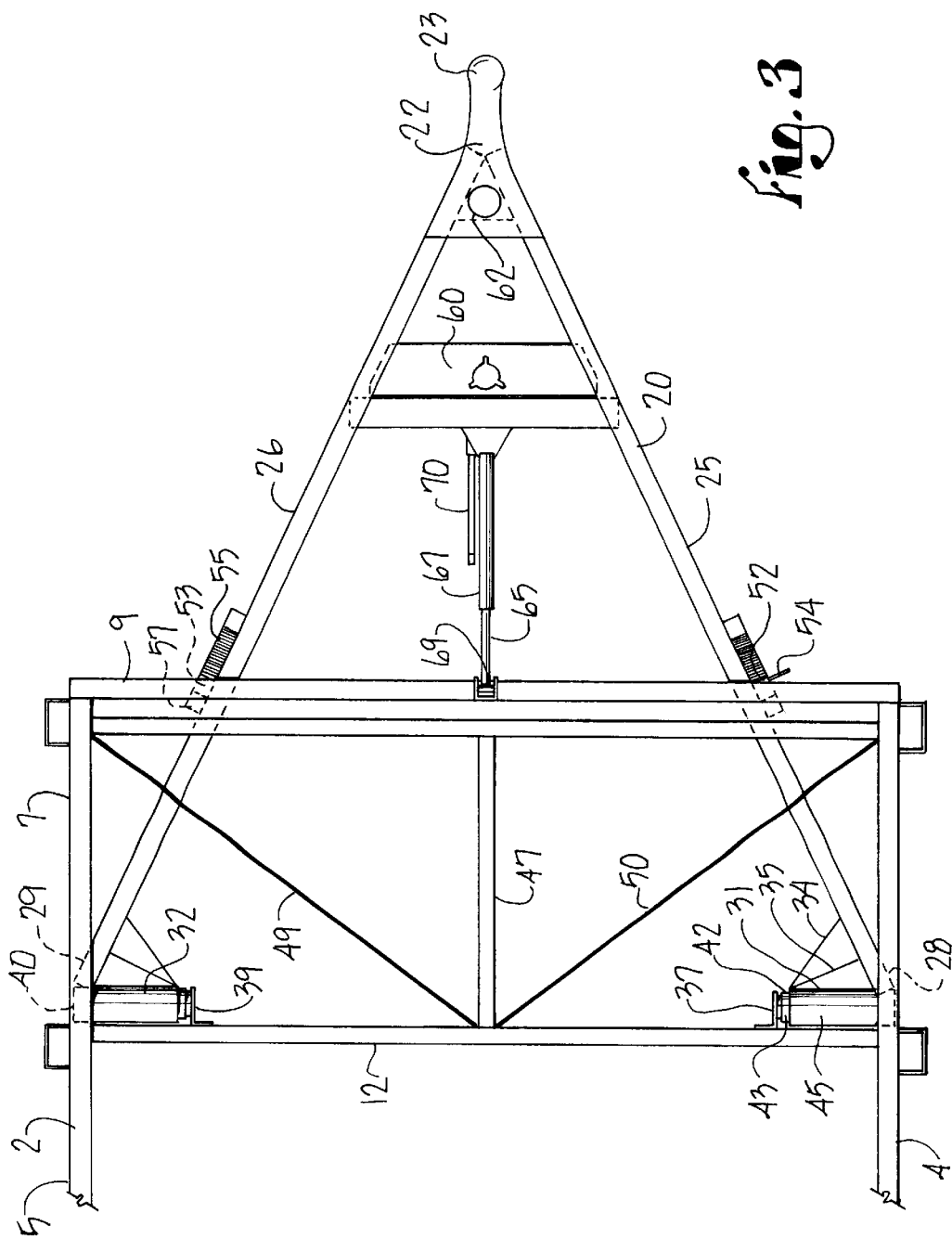

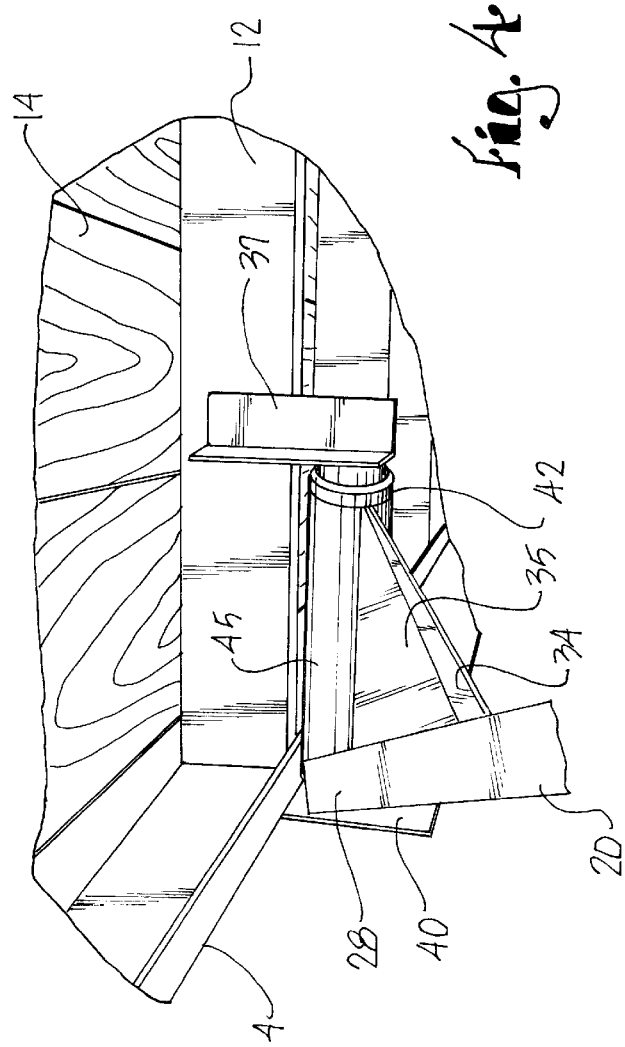
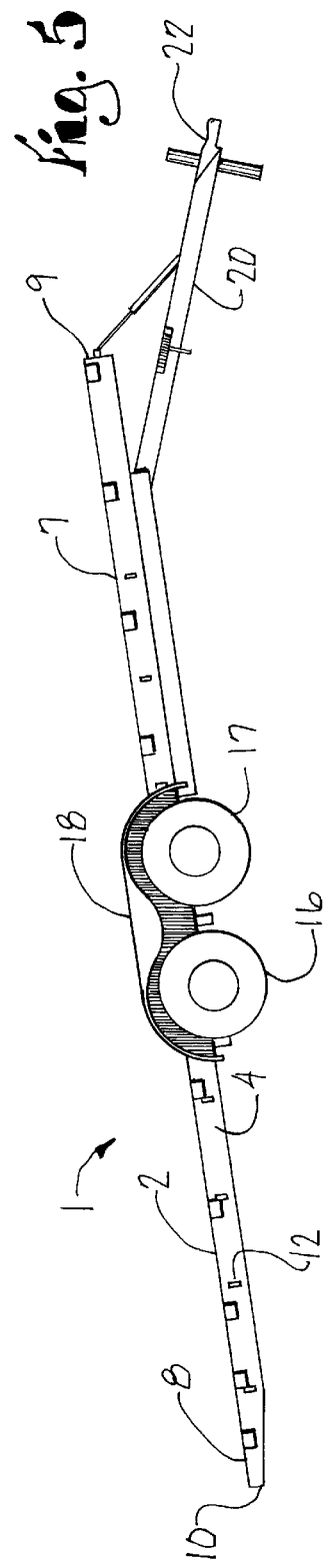

TILT BED TRAILER

BACKGROUND OF THE INVENTION

1. Field of the Invention

The present invention relates generally to trailers and in particular to tilt bed trailers with movable decks or beds which facilitate loading and unloading of vehicles and other cargo items.

2. Description of Related Art

Tilt bed trailers have been known for many years, and are often desirable for loading wheeled vehicles on the trailer. In a tilt bed trailer, this separate bed platform swings downwardly from a separate wheel frame to lower the platform rear end to the ground so that a vehicle may be driven or winched thereon. Other tilt bed trailers include mechanisms providing tilting between the draw tongue and the frame platform. Typically, there is a hinge means between the draw tongue and the trailer so that the front end of the trailer can be swung vertically and rotated about the transport wheels to lower the rear end of the trailer to the ground surface. Various means of tilting mechanisms have been devised; however, all suffer from various design deficiencies which increase cost, inefficiencies, or are unduly complicated.

Tilt bed trailers are particularly desirable when transporting wheeled vehicles such as small front end loaders for construction purposes, motorcycles and automobiles. It is common that motorcycle enthusiasts may drive their cars or trucks to an area of interest and then wheel their motorcycles off a tilt bed trailer to enjoy road touring or off-road riding within the area. In other situations, owners of special interest automobiles may trailer their auto to shows or to work on if the vehicle is not operational.

SUMMARY OF THE INVENTION

The present invention is directed to a tilt bed trailer which includes a frame platform with transport wheels. A V-shaped draw tongue has rearwardly diverging draw arms which terminate in sleeve ends that are spaced the width of the frame platform. Hinge connections extend between the frame platform and the draw tongue with each hinge connection including left and right hinge supports extending downwardly below the frame platform and the side rails with a hinge rod extending therebetween. The draw arm sleeve ends are sleeved on the hinge rods so that the draw tongue swings vertically relative to the frame platform. An extensible member such as a hydraulic ram extends longitudinally angularly between the platform front end and the front portion of the draw tongue so that upon extension the frame platform tilts upwardly and rearwardly about the transport wheels to lower the frame platform rear end to the ground for ease of loading.

OBJECTS AND ADVANTAGES OF THE INVENTION

The principal objects and advantages of the present invention are to provide a tilt bed trailer; to provide a tilt bed trailer which is light in weight and inexpensive for the proposed purpose; to provide such a tilt bed trailer in which a swingable tongue is connected to the trailer bed with a secure and rigid mounting; and to provide such a tilt bed trailer which is readily used without undue safety concerns.

Other objects and advantages of this invention will become apparent from the following description, taken in connection with the accompanying drawings wherein are set forth by way of illustration and example certain embodiments of this invention.

Brief description of the drawings

The following drawings constitute a part of the specification and include exemplary embodiments of the present invention and illustrate various objects and features thereof.

FIG. 1 is a plan view of a tilt bed trailer embodying the present invention.

FIG. 2 is a side elevational view of the tilt bed trailer.

FIG. 3 is an enlarged plan view of a front end of the tilt bed trailer.

FIG. 4 is an enlarged fragmentary view of the tilt bed trailer showing a hinged connection between the draw tongue and the trailer platform.

FIG. 5 is a side elevational view of the tilt bed trailer in tilted relationship.

DETAILED DESCRIPTION OF THE PREFERRED AND ALTERNATE EMBODIMENTS

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Referring to the drawings in more detail, reference numeral 1 generally designates a tilt bed trailer embodying the present invention. The tilt bed trailer 1 has a frame platform 2 of spaced side rails 4 and 5 with front and rear ends 7 and 8 culminating in front and rear end rails 9 and 10. A plurality of cross-rails 12 extend between the side rails 4 and 5 and are used for support of a platform 14, FIG. 1, such as of wood planks which are attached to the frame platform 2 and comprise a surface for loading a vehicle or other equipment on the tilt bed trailer 1. The platform 14 is partially shown in FIG. 1 although it will be understood that the platform 14 actually covers the whole of the frame platform 2. In FIG. 1, the platform 14 is shown in fragmentary view so that underlying structural features may be shown. The rails, including side rails 4 and 5, front and rear end rails 9 and 10 and cross-rails 12, are preferably all C-shaped steel rails. Transport wheels, such as the pairs of transport wheels 16 and 17, are mounted below the frame platform 2 generally intermediately of the front and rear ends 7 and 8. In the illustrated example, two pairs of transport wheels are shown. However, one pair may be used advantageously depending upon the gross vehicle weight requirements for the trailer. Fenders 18 cover the transport wheels 16 and 17. A V-shaped draw tongue 20 is mounted at the trailer front end 7 and has a forward apex 22, FIGS. 1 and 3, including a hitch 23 for receiving a trailer ball. The draw tongue 20 is formed of left and right draw arms 25 and 26, FIG. 3, which terminate in respective arm ends 28 and 29 spaced the width of the frame platform 2. Hinge sleeves 31 and 32 are respectively connected, as by welding, to the arm ends 28 and 29 and rigidly supported by gussets 34 which are triangular in shape and have a center angle 35.

Hinge connections 37 extending between the frame platform 2 and the draw tongue 20 for each of the arm ends 28 and 29 include inner and outer hinge supports 39 and 40, with the inner hinge support 39 consisting of a short piece of angle iron connected to the front cross rail 12 and extending downwardly therefrom. The outer hinge support 40 in the illustrated example is the front end of a separate side beam 41, FIG. 2, which extends from the hinge connection 37 rearwardly to the front transport wheel 17 and underlies the respective side rail 4 or 5 for added strength. An elongate, tubular hinge pin 42 is affixed between the inner and outer hinge supports 39 and 40 with the respective hinge sleeve 31 or 32 sleeved thereon. Collars 43 limit sideward movement of the hinge sleeve 31 or 32 on the hinge pin 42. A grease fitting 45 permits lubrication. The hinge pin 42 is approximately 2⅜ inches in diameter and 11½ inches long, the sleeve 31 or 32 approximately 10 inches long. The inner and outer hinge supports 39 and 40 provide an inexpensive yet very rigid support for the pin 42 so that no significant looseness or wobbling can occur between the draw tongue 20 and the frame platform 2. Also, to provide rigidity at the front end 7 of the frame platform 2, a short center rail 47 extends from the front cross rail 12 to the front end rail 9 and is flanked by angled rails 49 and 50 connected at inner ends to the connection between the center rail 47 and the front cross rail 12 and at outer ends to the outer comers between the front end rail 9 and the side rails 4 and 5. Together, the center rail 47, angled rails 49 and 50 and sturdiness of the hinge connections 37 provide a lightweight yet rigid structure. The draw tongue 20 swings in a vertical plane relative to the frame platform 2 on the hinge connections 37.

To selectively lock the draw tongue 20 to the frame platform 2, spaced latch pins 52 are utilized, each consisting of a pin 53 with handle 54 which rides in spaced supports (not shown) and is biased by a spring 55. The pin 53 is received in a tube receptacle 57 welded underneath the front end rail 9. A tongue cross support. 60 extends transversely between the draw arms 25 and 26 aft of the apex 22. An extensible member 65 is mounted between the tongue cross support 60 and the frame platform 2 such as on the front end rail 9. The extensible member, in the illustrated example, is a hydraulic ram 67 with swingable mounts 69 at front and rear ends. The hydraulic ram 67 may be operated by an electric motor or may, as in the illustrated example, include a manual pump with handles 70. Appropriate spring catches are normally provided on the tongue cross support 60 to secure the removable handle 70. A leveler jack 62 such as a screw jack, commonly used in trailers, is mounted at the tongue apex 22 and is extensible downwardly therefrom to support the front end of the draw tongue 20 above a ground surface.

To operate the tilt bed feature of the tilt bed trailer 1, the leveler jack 62 is cranked downwardly until it engages the ground below and provides additional support for the draw tongue apex or front end 22. The hitch 23 may be left connected to the towed vehicle or it may be disconnected. When left connected, extending the leveler jack 62 provides additional support so that the rear end of the tow vehicle is not unduly loaded as the frame platform 2 tilts. After the leveler jack 62 is extended, the.latchpins 52 are retracted to unlock the frame platform 2 from the draw tongue 20. The extensible member 65, such as the hydraulic jack 67, is operated to extend and raise the platform front end 7 upwardly of the draw tongue 20, swinging the frame platform 2 about the hinge connections 37. The hydraulic ram 67 is actuated until the platform rear end rail 10 contacts the ground; then, a vehicle to be loaded or unloaded on the trailer is moved.

Lowering the frame platform 2 is the opposite of the above procedure.

It is to be understood that while certain forms of the present invention have been illustrated and described herein, it is not delimited to these specific forms or arrangement of parts described and shown except insofar as limited by the following claims.

What is claimed and desired to be secured by Letters Patent is:

1. A tilt bed trailer for carrying motorcycles, automotive vehicles and other heavy, wheeled objects, comprising:
   a) a robust frame platform of spaced side rails, front and rear ends with front and rear end rails, cross rails and a platform mounted thereon to support an object being transported;
   b) at least one pair of transport wheels mounted under the frame platform;
   c) a V-shaped draw tongue with a forward apex connected to a hitch and with rearwardly diverging draw arms terminating at left and right hinge connections extending angularly away from terminations of the draw arms, the draw arm terminations being spaced substantially apart the width of said frame platform;
   d) said left and right hinge connections being aligned and swingably mounting the draw arms to said frame platform so that said frame platform tilts relative thereto for loading, each hinge connection comprising a sturdy sleeve member and a rod member fitted within said sleeve member, the hinge connections being offset from the draw arm terminations and providing robust, swingable connection between the frame platform and the draw arms;
   e) an extensible member having ends swingably mounted between said platform front end rail and adjacent the forward apex of the draw tongue so that upon extension of said extensible member, said frame platform tilts upwardly about said transport wheels as said draw tongue remains stationary to lower the rear end rail toward the ground for ease of loading; and
   f) said sleeve member being attached to the draw arm termination and said rod member being mounted from a frame cross rail.

2. The tilt bed trailer set forth in claim 1 including gusset reinforcements extending between the sleeve member and said draw arms adjacent said terminations.

3. A tilt bed trailer for carrying motorcycles, automobiles, tractors and other wheeled, heavy objects, comprising:
   a) a robust frame platform of spaced side rails, front and rear ends with front and rear end rails, cross rails and a platform mounted thereon to support an object being transported;
   b) at least one pair of transport wheels mounted under the frame platform;
   c) a V-shaped draw tongue with a forward apex connected to a hitch and with rearwardly diverging draw arms terminating at left and right hinge connection sleeves extending respectively angularly inward from terminations of the draw arms, the draw arm terminations being spaced apart substantially the width of said frame platform;
   d) left and right aligned hinge assemblies swingably mounting the draw arms to said frame platform so that said frame platform tilts relative thereto for loading, each hinge assembly comprising said sleeve and a rod mounted below a cross rail of said frame platform, said sleeve being sleeved on said rod, and with a gusset reinforcement extending between the draw arms adjacent said terminations to the sleeves, and providing robust swingable connection between the frame platform and the draw arms; and e) an extensible member having ends swingably mounted between said platform front end rail and adjacent the forward apex of the draw tongue so that upon extension of said extensible member, said frame platform tilts upwardly at said front end about said transport wheels as said draw tongue remains stationary to lower the rear end toward the ground for ease of loading.

* * * * *